May 30, 1950
A. D. GUY
2,509,430
TRAVELING SIDE DELIVERY RAKE
Filed March 19, 1947
3 Sheets-Sheet 1
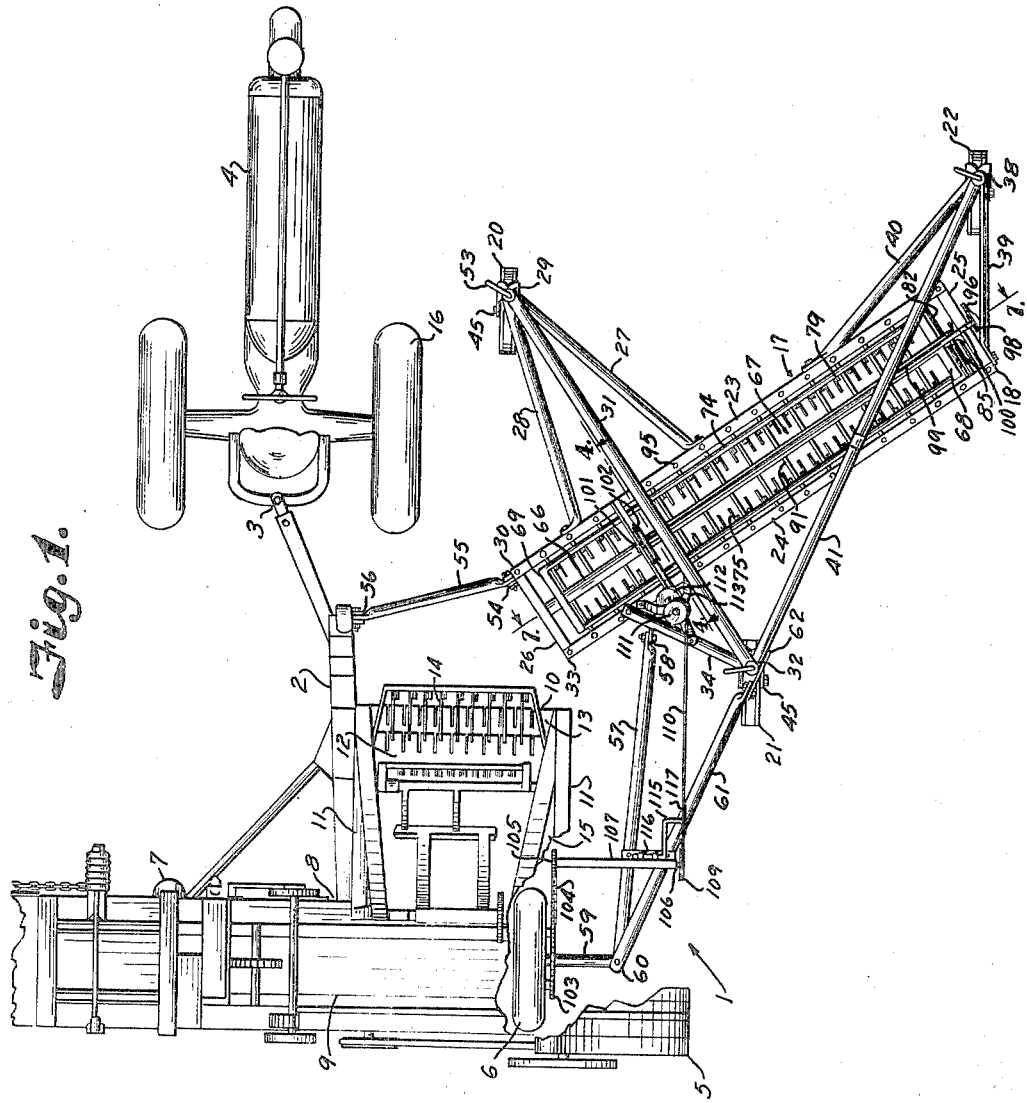
Inventor
*Alfred Dean Guy*
By
*Fishburn & Mullendore*
Attorneys May 30, 1950 A. D. GUY 2,509,430
TRAVELING SIDE DELIVERY RAKE
Filed March 19, 1947 3 Sheets-Sheet 2
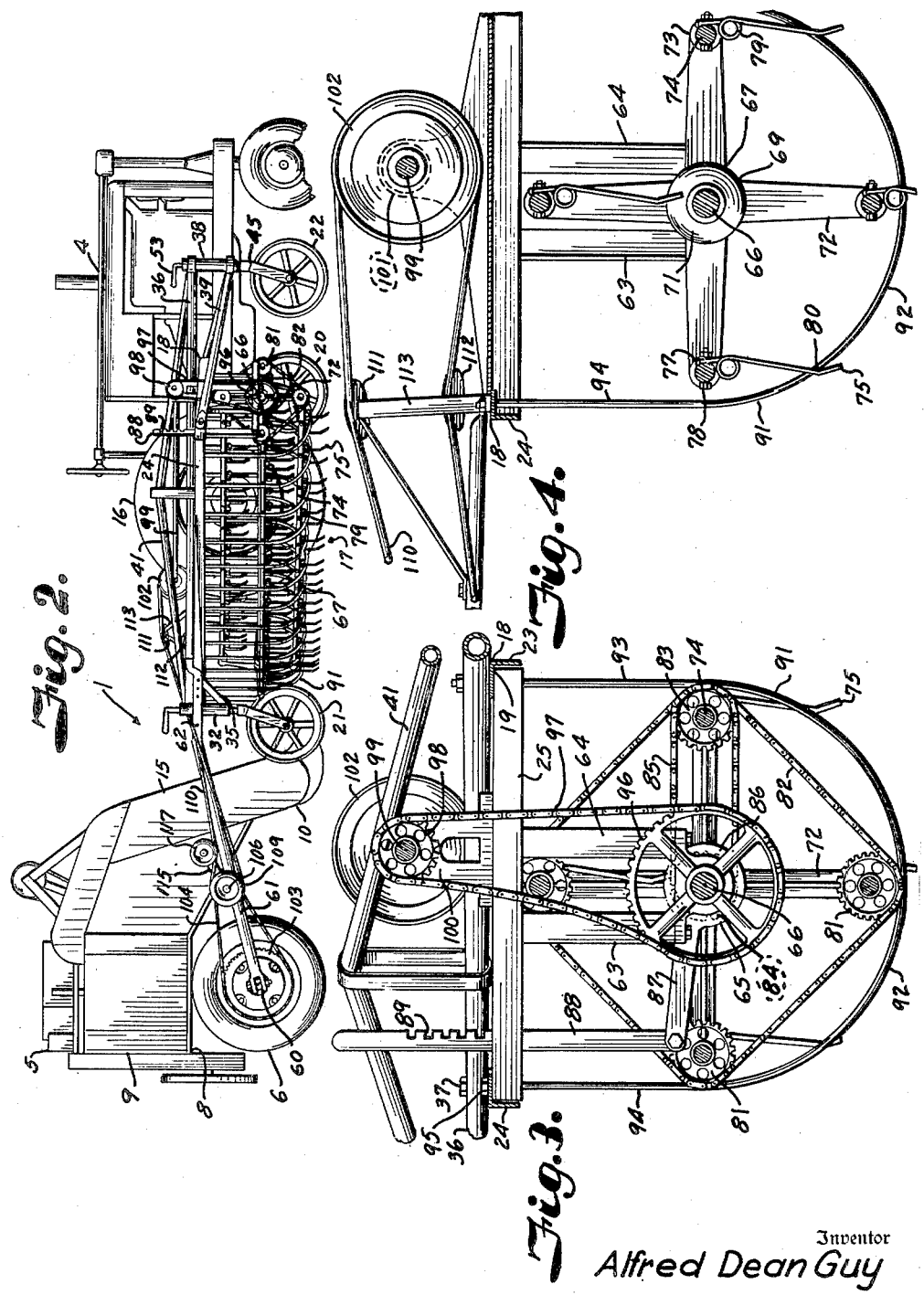
Inventor
Alfred Dean Guy
By Fishburn & Mullendore
Attorneys

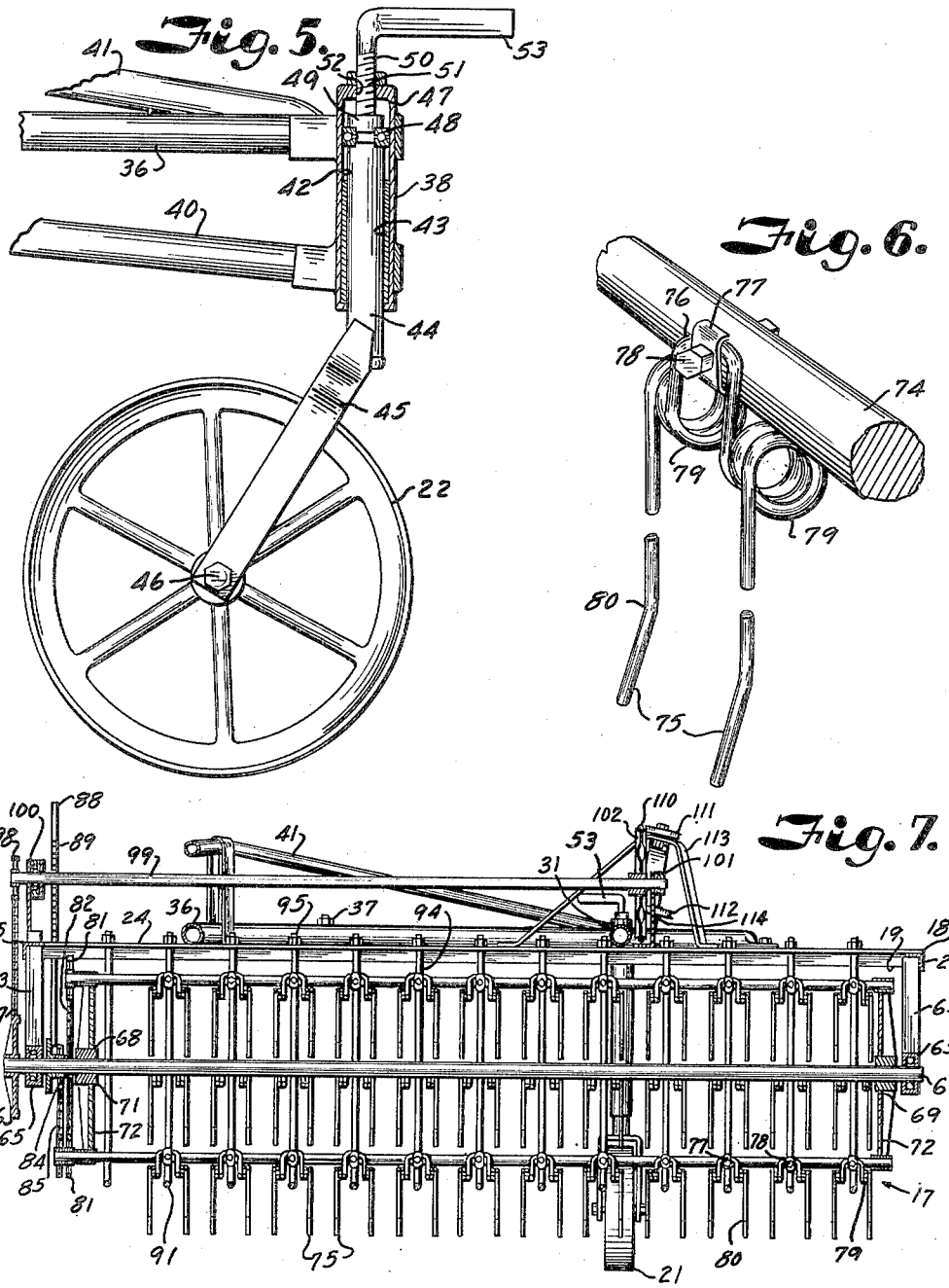

Patented May 30, 1950

2,509,430

UNITED STATES PATENT OFFICE 2,509,430

TRAVELING SIDE DELIVERY RAKE

Alfred Dean Guy, Homewood, Kans.

Application March 19, 1947, Serial No. 735,738

3 Claims. (Cl. 56—355)

This invention relates to a traveling rake and baler and more particularly to improvements in apparatus for baling hay, straw, and other like material, and has for its principal object to provide an apparatus for moving through a field, raking hay, straw, and other like loose or mowed material, picking up the raked material, forming same into a bale and delivering tied bales along the path of travel.

There are some balers that may be towed by a tractor through a field for picking up hay and the like and baling same. In using such equipment, it is necessary to draw a mower through the field to mow the growing crop, then rake the field to arrange the crop in windrows or piles. After the field has been raked, a baler having a pickup device thereon is moved through the field along a windrow to pick up the crop and feed same to a press for packing, tying and delivering the bale of hay and the like. The present invention is designed to eliminate some of the travel through the field.

Other objects of the present invention are to provide a pickup baler with a rake in angular relation to the direction of travel of the baler and flexibly connected thereto for conforming to the contour of the surface over which it is operated; to provide a three-point suspension for a rake having means for maintaining angularity between the rake and baler; to provide for driving the moving members of a rake from the baler to which said rake is attached; to provide a fully automatic, one man operated apparatus for raking, picking up and baling hay and the like; to provide a relatively light weight, compact, flexible, tractor drawn, wide swath structure for raking, picking up and baling hay and like mown crops in the field; to provide for adjusting clearance between the rake and the surface over which it is operated; to provide for maintaining the rake fingers in a substantially vertical position as they are rotated about a rake reel axis; to provide wheel supports for the rake and baler whereby the apparatus may be drawn around an arcuate path; and to provide an apparatus of the character described of relatively simple and flexible structure, capable of operation over variations in contour of surface, moved in a straight or arcuate path, raking, and picking up a wide swath of mown crops in the field and baling same, said apparatus being durable, sturdy, capable of long, efficient service and providing a one man operation for raking, picking up and baling hay and the like.

In accomplishing these and other objects of the present invention, I have provided improved details of structure, the preferred forms of which are shown in the accompanying drawings, wherein:

Fig. 1 is a plan view of a rake and baler apparatus embodying the features of the present invention, illustrating the arrangement of the respective parts thereof as they are being drawn by a tractor.

Fig. 2 is a side elevation on the pickup side of the rake and baler apparatus.

Fig. 3 is an end elevation of the rake mechanism illustrating the drive therefor.

Fig. 4 is a transverse sectional view through the rake on the line 4—4, Fig. 1.

Fig. 5 is a detail sectional view through the mounting of one of the caster wheels for the rake mechanism.

Fig. 6 is a detail perspective view of the mounting of the resilient rake fingers.

Fig. 7 is a longitudinal sectional view through the rake on the line 7—7, Fig. 1.

Referring more in detail to the drawings:

I designates a raking and baling apparatus embodying the features of the present invention provided with a drawbar 2 connected to the usual draft gear 3 of a tractor 4, by which the baler and rake are drawn through the field, the front end of the baler being supported in suitable manner as it travels over the ground. In the illustrated structure, the baler portion 5 of the apparatus is carried by wheels 6 and 7 supporting a frame generally designated 8, on which is mounted conventional packing and baling apparatus. The baling case or chamber 9 is shown at right angles to the direction of travel but may be arranged on the frame in any suitable manner. A pickup unit 10 is pivotally attached to the baler frame and is raised and lowered to meet field conditions and for transportation to and from the field, power being provided for operating said pickup unit by a suitable mechanism (not shown) connected with the wheels 6 and 7 of the apparatus. The baler is preferably equipped with its own prime mover, but may be conveniently operated by motive power of the tractor by means of a suitable power takeoff for operating said baling apparatus and, if desired, may also drive the pickup.

The pickup device 10 extends forwardly of the main frame of the baler, having a pair of girders 11 extending forwardly in spaced relation to support a conveyor belt 12 and operating parts therebetween. The forward end of the girders carries a drum 13, having a plurality of sets of pickup fingers 14 arranged thereon whereby the fingers will engage the material on the ground and move same upwardly and rearwardly and deliver said material to the forward end of the belt, suitable driving mechanism for the pickup apparatus being enclosed in the housing 15 to provide rearward movement of the material to the baler case or chamber where the material is severed from the flowing stream by means of a conventional severing device and packed into a bale. The girders are so arranged relative to the drawbar that the pickup device is preferably located between the main frame of the baler and the rear wheels of the tractor, the side of the pickup toward the center line of the tractor being located behind the rear wheel 16 thereof and extending laterally thereof a suitable width for handling a conventional windrow.

The rake portion 17 of the apparatus is located on the same side of the tractor as the pickup device and preferably arranged in angular relation to the direction of travel of the apparatus, the delivery side of said rake being so positioned relative to the pickup that all of the hay or like material will be delivered in front of said pickup whereby substantially no material will be left in the field in the swath being raked and picked up by the apparatus. The rake consists of a rectangular frame 18, preferably formed of angles 19 or other suitable structural shapes, and is adjustably supported in spaced relation to the ground by means of wheels 20, 21 and 22, preferably arranged in spaced relation to the frame 18 by means of suitable bracing now to be described.

The frame 18 consists of longitudinal members 23 and 24, connected at their ends by transverse members 25 and 26. Secured to the longitudinal member 23 and projecting forwardly and downwardly therefrom are arms 27 and 28, converging at their outer ends to carry a vertically arranged bearing housing 29, the bearing housing and arms preferably being so located as to be substantially alongside of the adjacent tractor wheel 16 and operating in a path spaced slightly toward the tractor from the corner 30 of the frame 18 formed by members 23 and 26. The arms 27 and 28 preferably are formed of tubular members and are connected adjacent the lower end of the bearing housing 29, the upper end of said bearing housing being connected to a tubular member 31 extending rearwardly therefrom and at right angles to the member 23 of the frame 18. The member 31 extends over the top of the frame and is suitably secured thereto, the rear end of said member 31 being connected to the upper end of a bearing housing 32 for mounting the wheel 22, said wheel preferably being substantially in alignment with the rear corner 33 of the frame formed by the members 24 and 26, the bearing housing 32 being further braced with the frame by means of an arm 34 having connection with the angle 24, the lower end of the bearing housing 32 being supported by a brace 35 connected to said bearing housing and to the arm 34 in spaced relation to said housing.

A tubular member 36 connects with the upper end of the bearing housing 32 and extends forwardly and laterally over the frame 18 and is secured thereto by suitable fastening devices 37, the forward end of the member 36 being connected to a bearing housing 38 substantially in line with the outer end of the frame formed by the members 23 and 24, the lower end of the housing 38 being connected with the frame 18 by arms 39 and 40. To further add strength to the structure a truss member 41 is provided over the member 36, the ends of said member being connected to the member 36 and to the bearing housings 32 and 38. Each of the bearing housings 29, 32 and 38 is constructed as illustrated in Fig. 5 wherein the housing consists of a tubular member having a bore 42 having bearings 43 therein for mounting a shaft 44 projecting downwardly below the bearing housing and carrying a U-shaped yoke 45 or other suitable structure for mounting the spindle 46 of the wheels 20, 21 and 22 respectively. The shafts 44 are preferably rotatable in the respective housing and terminate short of the upper end 47 thereof to provide space for a thrust bearing 48 between the end of the shaft and a collar 49 mounted on a shank 50 provided with external threads 51 adapted to be screwed into a threaded opening 52 in the upper end of said bearing housings, the upper end of the shank 50 being bent laterally to provide a handle 53 for rotating the shank to adjust the relative position of the spindles 46 and wheels relative to the bearing housings and thereby adjust the height of the rake frame from the ground.

This structure provides a three-point support for the rake structure, the support being on three caster wheels to facilitate the passage of the rake over the contour of the surface. The rake frame is secured to the baler to support said frame and maintain the angularity between the rake and path of travel of the apparatus. The corner 30 of the frame 18 is preferably provided with ears 54 pivotally mounting one end of a tie bar 55, the other end of which is pivotally connected to ears 56 on the drawbar of the baler. The rake and baler are further connected by a tie bar 57 having one end pivotally connected with ears 58 on the member 24 of the rake frame adjacent the connection of the arms 34 therewith, the tie bar 57 preferably having its other end pivotally connected to the axis 59 of the baler wheel 6, as at 60. Also pivotally connected to the axle 59 is a tie bar 61 having its other end pivotally connected to a plate member 62 mounted on the bearing housing 32 in such a manner that it substantially forms a continuation of the member 36. The frame 18, together with the bracing for carrying the wheels 20, 21 and 22, and the tie bar connection between the rake frame and the baler, maintains the angularity between the rake and the path of travel of the baler. The three-point mounting of the rake, together with the pivotal connection between the tie bars 55, 57 and 61, between the baler and the rake frame, permits the wheels 20, 21 and 22 to pass over uneven ground and maintain contact therewith without creating additional stress on the baler or tractor. In other words there is a floating connection permitting tilting and raising and lowering of the rake frame relative to the baler without changing the angularity of the rake therewith.

Extending downwardly and centrally located relative to the members 25 and 26 are spaced posts 63 and 64 carrying bearing members 65 for supporting a shaft 66 for mounting a reel 67. The reel consists of spiders 68 and 69 adjacent the bearing members 65 at each end of the shaft 66, the spiders consisting of a hub 71 rigidly secured to the shaft 66 and having oppositely disposed arms 72, the ends of the arms having bosses 73 bored to rotatably mount shafts 74. There are preferably four arms on each spider and a shaft 74 carried at the outer ends of each arm, said shafts 74 extending substantially the full length of the rake. Each of the shafts 74 is provided with a plurality of spring fingers 75 particularly illustrated in Fig. 6. The fingers are constructed in pairs and provided with a bar portion 76 secured by a clip 77 which is clamped by means of a bolt or the like 78 extending through the shaft 74. The ends of the spring fingers at each end of the bar 76 are bent downwardly and provided with a plurality of coils 79 terminating in downwardly extending fingers, the lower end of the fingers being bent forwardly as at 80. Pairs of fingers are mounted on the shafts 74 and spaced therealong to provide downwardly extending fingers substantially throughout the length of the rake. In order to maintain the fingers 75 in a substantially vertical position the outer ends of the shafts 74 are provided with sprockets 81 having a chain 82 extending around all of the sprockets on the reel to operatively connect same. One of the shafts 74 is also provided with an additional sprocket 83 in alignment with a sprocket 84 on the shaft 66 and operatively connected therewith by a chain 85. The sprocket 84 is rotatably mounted on the shaft 66 and is provided with a flange 86 having an arm 87 extending rearwardly of the shaft 66. The arm 87 is pivotally connected to a link 88 having a plurality of notches 89 therein adapted to engage the frame member 24. Adjustment of the link vertically of the frame rocks the arm 87 and sprocket 84 on the shaft 66 and any movement of sprocket 84 is transmitted by the chains 85 and 82 to each of the shafts 74, rocking same and the fingers thereon. Therefore movement of the link 88 adjusts the position of the fingers 75, and when the shaft 66 is rotated to rotate the spider and the reel the chain 85 will operate over the stationary spocket 84, thereby retaining the sprocket 83 and through the chain 82 all of the sprockets 81 and shafts 74 in substantially the same position of the fingers 75, that is a substantially vertical position during the rotation of said reel.

A plurality of U-shaped rods 91 are mounted on the frame and preferably have lower portions 92 bent in substantially a semicircle with the center at the axis of the shaft 66, the radius being of sufficient size that the legs 93 and 94 in the arcuate portion 92 are spaced outwardly from the path of travel of the shafts 74, the legs 93 and 94 extending through the angles 23 and 24. Nuts 95 are threaded on the upper ends of said legs for securing same to the rake frame. These arcuate rods provide guards for the fingers to prevent solid objects on the ground from coming in contact with the rotating mechanism of the reel and to keep straw or hay from balling up therein. The rods also form guards to cooperate with the fingers whereby when the reel is rotated in an anticlockwise direction (Fig. 3) the movement of said fingers across the bottom of the rake will be forwardly to kick hay, straw and the like to the front of the guards. Subsequent engagement of the other fingers with the hay will tend to move same transversely of the path of travel of said apparatus and toward the tractor and path of travel of the pickup mechanism 10.

The reel is preferably operatively connected to and driven by a traction wheel suitably mounted on the apparatus and in the illustrated structure such function is performed by the traction wheels 6 of the baler. A suitable drive for the reel is arranged by providing the outer end of the shaft 66 with a sprocket 96 operatively connected by a chain 97 with a driving sprocket 98, mounted on a shaft 99 carried by bearing brackets 100 and 101 secured to the frame 18, whereby said shaft 99 is arranged longitudinally of said frame and spaced thereabove. Secured to the shaft 99 adjacent bracket 101 is a pulley 102 which is driven by any suitable means and preferably from the traction wheel 6 of the baler. It is essential that the drive be such that rise and fall of the rake relative to the baler in passing over uneven ground will not alter the positiveness of said drive. A sprocket 103 is preferably mounted on the wheel 6, said sprocket having a chain 104 operated thereover to drive a sprocket 105 mounted on a countershaft 106 supported in a bearing 107 which is secured to the members 57 and 61, the shaft 106 extending outwardly beyond the member 61 and mounting a pulley 109, said pulley having a belt 110 operating thereover and drivingly engaging the pulley 102.

Due to difference in the angularity of the baler and the rake, it is desirable to have the shaft 106 parallel with the axle 59 of the baler wheels and provide idler pulleys for changing the direction of the operation of the belt to align same with the pulley 102. Such an arrangement is illustrated in Fig. 4 whereby idlers 111 and 112 are provided for the upper and lower runs of the belt over the pulley 102, said pulleys 111 and 112 being mounted on brackets 113 and 114 respectively. In order to maintain the belt 110 tight, an arm 115 is pivotally mounted as at 116 to the arms 57 and 61, the arm 115 carrying an idler pulley 117 adapted to rest on the upper run of the belt 110 and apply sufficient pressure thereto to maintain the belt tight.

The structure may be easily disassembled for storage by removing the tie bars 55, 57 and 61, from either the rake portion or the baler portion of the apparatus, or said tie bars may be removed entirely and each unit stored in a barn or other suitable cover, thereby reducing the space required for such storage.

In using a device constructed and assembled as described, the baler and rake are moved into the open and the rake arranged at the proper angular relation as illustrated in Fig. 1, and the tie bars 55, 57 and 61 connected to the rake and baler. The drawbar 2 is then connected to the draft gear of a tractor 4 and the structure is ready to move through the field of mown crops. As the tractor draws the apparatus through the field, traction of the wheels 6 and 7 provides the power for the operation of the respective moving parts of the rake, the baler parts being driven by a prime mover or suitable power takeoff on the tractor. Rotation of the wheel 6 and the sprocket 103 attached thereto drives the sprocket 105 through the chain 104 to rotate the countershaft 106 and the pulley 109 driving the shaft 99 through the belt 110 and pulley 102. Rotation of the shaft 99 operates the sprocket 98 to drive the sprocket 96 through the chain 97, rotating the shaft 66 and the reel 67. As the reel is rotated the fingers 75 carried by the shafts 74 are held in selected angularity due to a chain 85 operatively connecting the sprocket 84 arranged coaxial with the shaft 66 and held stationary by connection of the arm 87 and link 88, said chain 85 operating over sprocket 83 on one of the shafts 74 whereby movement of the reel around the axis thereof will maintain a point on the shaft 74 in the same relative position throughout the rotation of the reel. Therefore the fingers will remain in selected position as illustrated in Fig. 4. All of the shafts 74 having sprockets thereon and the chain 82 operatively connected with said sprockets, each of the shafts 14 will maintain the fingers substantially in vertical condition.

The spindles for the wheels 20, 21 and 22 are preferably adjusted in the bearing housings to provide clearance between the ends of the fingers and the ground, one inch clearance being suitable, as the fingers are springs which will flex to pass over any irregularity without damage to the apparatus. As the apparatus is moved forwardly and the reel rotated, the fingers pass in a forward direction to move hay or other crops forwardly and laterally relative to the path of travel of the device to progressively move all of the hay in the path of the rake into the path of the pickup mechanism 10. Forward movement of the apparatus also operates the belt and fingers on the pickup mechanism to pick up both the hay that has been moved into the path of said pickup and the hay that was normally in front of same, the hay being moved upwardly by the conveyor 12 into the baling chamber where it is packed, tied, and discharged from the baling apparatus. Operation of the device over uneven ground will cause pivoting of the tie bars connecting the rake and baler permitting relative movement and allowing the apparatus to conform to the terrain to take and pick up substantially all of the mowed material.

A particular form and arrangement of the apparatus is illustrated and described, however, it is obvious that modifications may be made therein without departing from the scope of the invention.

What I claim and desire to secure by Letters Patent is:

1. In a device for raking and picking up hay or like material in the field, a vehicle, wheels on said vehicle for supporting same, means for moving the vehicle through the field, means for picking up material from the ground as the vehicle moves through the field, a frame arranged forwardly and laterally and at an angle to the path of travel of the vehicle, caster wheels arranged around the frame having adjustable connection therewith and each of said wheels having a different spacing forwardly of the pickup for the vehicle to provide adjustable three-point suspension for said frame, a reel rotatably mounted on said frame, a plurality of resilient fingers carried by the reel for movement in a circular path and adapted to engage material in the field in the path of travel thereof for moving said material laterally of said path of travel and into the path of travel of the vehicle pickup, a plurality of rigid means pivotally connected at spaced points on the frame and vehicle for maintaining the angular relation therebetween, means operatively connecting a wheel of the vehicle with the reel on the frame for moving said fingers, and means on the frame for maintaining the rotating parts thereon free of material being raked.

2. In a device for raking and picking up hay or like material in the field, a vehicle, wheels on said vehicle for supporting same, means for moving the vehicle through the field, means for picking up material from the ground as the vehicle moves through the field, a frame arranged forwardly and laterally and at an angle to the path of travel of the vehicle, caster wheels arranged around the frame having adjustable connection therewith and each of said wheels having a different spacing forwardly of the pickup for the vehicle to provide adjustable three-point suspension for said frame, a reel rotatably mounted on said frame, a plurality of resilient fingers carried by said reel for movement in a circular path and adapted to engage material in the field in the path of travel thereof for moving said material laterally of said path of travel and into the path of travel of the vehicle pickup, a plurality of rigid means pivotally connected to the frame and the vehicle at spaced points for maintaining the angular relation therebetween, said pivotal connections being on horizontal axes for independent vertical movement of the vehicle and frame when passing over uneven ground, means operatively connecting a wheel of the vehicle with the reel on the frame for rotating said reel, means responsive to rotation of said reel for maintaining the fingers in the same relative angularity to the ground, means for adjusting the angularity of the fingers, and means on the frame for maintaining the rotating parts thereon free of material being raked.

3. In combination, a vehicle supported on a pair of wheels for movement in a field and having a pickup mechanism extending forwardly for picking up material from the ground as the vehicle moves through a field, and a draw bar extending forwardly alongside the pickup mechanism, a tractor hitched to the vehicle draw bar for moving the vehicle through a field and supporting the forward end of said draw bar, a side delivery rake having a frame carrying a rotatable reel, said rake being forwardly and laterally at an angle to the path of travel of the vehicle for raking material on the ground into a windrow in front of the pickup mechanism, caster wheels adjustably supporting the rake, said wheels being arranged at different spacing forwardly of the pickup mechanism to provide a three point suspension of the rake, one of said wheels being to the rear of the rake and the others forwardly of and substantially in alignment with the ends of the rake, rigid means extending from the rake to the draw bar, means pivotally connecting the ends of said rigid means to the rake and draw bar for pivotal movement about horizontal axes, rigid means having spaced pivotal connections with the rake and pivotal connection with the vehicle, said pivotal connections being on horizontal axes whereby the rake and vehicle are supported independently from the ground and the angular relationship of said rake and vehicle is maintained, and driving means connecting a wheel of the vehicle and the reel of the rake for rotating said reel therefrom as the vehicle is moved through a field.

ALFRED DEAN GUY.

REFERENCES CITED

The following references are of record in the file of this patent:

UNITED STATES PATENTS

| Number | Name | Date |
|---|---|---|
| 1,285,963 | Estep | Nov. 26, 1918 |
| 1,715,306 | Peterson | May 28, 1929 |
| 1,728,301 | Murphy et al. | Sept. 17, 1929 |
| 1,877,770 | Larson | Sept. 20, 1932 |
| 2,041,182 | Hume et al. | May 19, 1936 |
| 2,237,002 | Kelley | Apr. 1, 1941 |
| 2,296,065 | Slamp | Sept. 15, 1942 |
| 2,381,620 | Russell | Aug. 7, 1945 |